Figure 1:
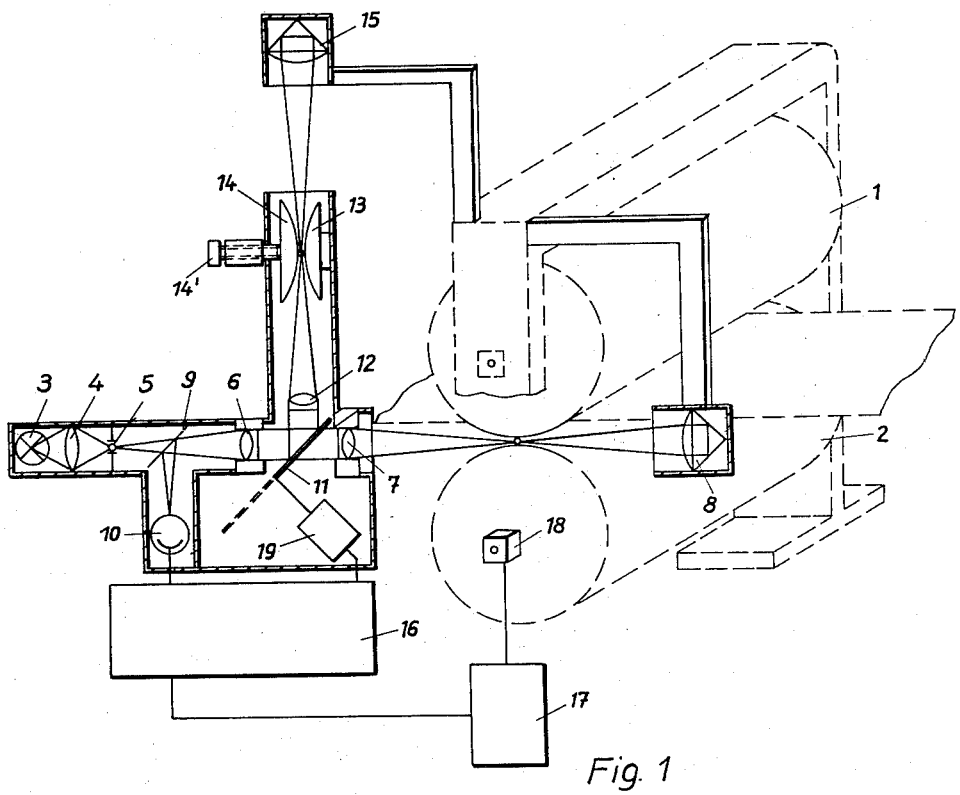

United States Patent Office 3,102,960
Patented Sept. 3, 1963

3,102,960
PHOTOELECTRIC DEVICE FOR HIGH PRECISION
LINEAR MEASUREMENT
Erwin Sick, Irschenhausen, Post Ebenhausen, Germany
Filed July 18, 1960, Ser. No. 43,353
Claims priority, application Germany July 20, 1959
4 Claims. (Cl. 250—220)

The invention relates to a photoelectric device for high precision linear measurement, in particular for measuring objects of greater dimensions.

A device for measuring thread thicknesses is known where the thread to be measured serves as a light stop for measuring beam of rays fed on a photoelectric element, and where the intensity of the measuring beam of rays is compared to the intensity of a comparison beam of rays in the radiation passage of which a thread of normal thickness is inserted also as a light stop. Thereby a photoelectric element is provided for each the measuring beam and the comparison beam.

The invention is based on the discovery that such a high precision linear measuring device operating with an object of comparison is applicable for high precision optical measurings also of objects of greater dimensions only under certain conditions. For the purpose of elimination of phenomena of diffraction and reflection with the necessarily sharply focused measuring and comparison beams of rays it is required to use objects of comparison the shape and surface condition of which correspond to the object of measurement. If, for example, the vertex of a rotating body having a large diameter is taken a bearing to, the aperture of the reflected beam of rays is diminished to a great extent by the very flatly bent surface of the body acting as aperture diaphragm and such a small aperture naturally results in diffraction phenomena. With measuring microscopes the vertex line of the object of measurement is seen manifold corresponding to the diffraction figures of the different orders. Correcting tables have been provided in order to be able to take those phenomena into account.

However, if an object of comparison corresponding to the object of measurement is being used as diaphragm for the comparison path of rays, where the diffraction phenomena occur in the same manner, clear photoelectric measuring values are obtained without any corrections. It is however also a prerequisite for great measuring precision that measuring and comparison beams of rays hit one and the same photoelectric element, in order to eliminate errors through variable sensitivity and characteristics of different elements. A device, well-known with radiation comparison systems, must be provided making it possible to feed periodically and alternatingly the measuring rays and the comparison rays to the same photoelectric element. With reference to space and design considerable difficulties arise, in particular with measuring objects of greater dimensions to re-unite in an exact manner on the one hand the measuring rays to be passed by the object of measurement and on the other hand the comparison rays to be fed to the object of comparison. These difficulties lie above all in the fact that between light source and optical systems positioned on this side of the objects of measurement and comparison and the photoelectric element positioned on the other side of the objects of measurement and comparison a mechanical connection defining the mutual position should be provided. If however—as is well-known with photoelectric controls—reflex-reflecting means, that is to say reflecting means which reflect any ray incident within a certain solid angle back along its path of incidence, e.g. triple reflectors, are applied which independently of the direction of incidence reflect the rays of measuring and comparison in themselves and arrange them beyond the objects of measurement and comparison, the photoelectric element can be arranged near the source of light also on this side of the objects of measurement and comparison and consequently a mechanical connection extending around the objects of measurement and comparison can be dispensed with.

Therefore the invention consists in that with a photoelectric device for high precision linear measurement where the intensities of a measuring beam of rays being attenuated by the object of measurement and of a comparison beam of rays being attenuated by an object of comparison are photoelectrically compared, the object of comparison corresponds to the object of measurement relative to shape and surface condition, the comparison and the measuring beams of rays are directed periodically by reflex reflecting means (triple) arranged on the other side of the objects of measurement and comparison and a moveable reflecting member on a common photoelectric element arranged near the light source on this side of the objects of measurement and comparison.

A photoelectric device of this type offers the possibility of highly exact measurements and controls. Due to the reversal of the radiation beam by means of reflex-reflecting means adjusting difficulties are avoided also with great objects of measurement. Furthermore, both radiation beams are measured by one and the same photoelectric cell so that no measuring errors can occur due to differences in sensitivity of the radiation detector. The invention is applicable, for example, for the purpose of supervision and control of roll gaps in sheet mills or for the purpose of controlling turning lathes, which can automatically be switched off if the production part has reached a certain diameter. The invention is important especially for those turning lathes where production parts having extremely large dimensions, e.g. a diameter of some meters are worked. With known means the diameter of the production part can then be measured sufficiently exactly and tested only at a great expense. As against this it has been proven that with an arrangement according to the invention a diameter of some meters can be scanned exactly photoelectrically even to some hundredth millimeter.

Figure 2:
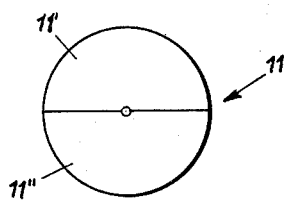
Figure 3:
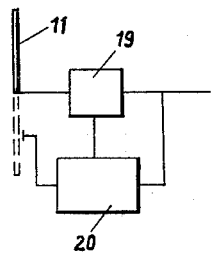
Figure 4:
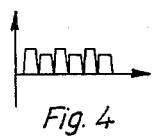
Figure 5:
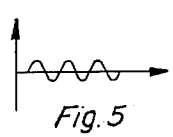
Figure 6:
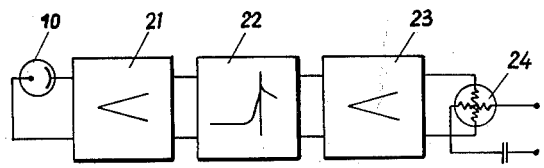
Figure 7:
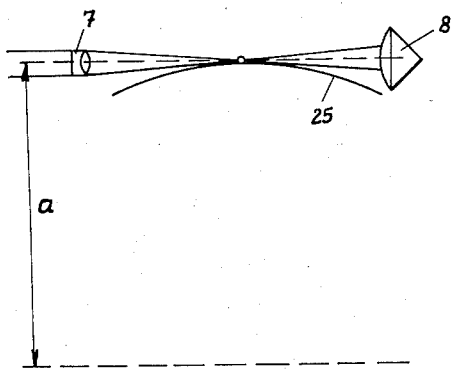

Two embodiments of the invention are shown in the drawings and described in the following:

FIG. 1 shows a device for supervising and controlling a roll gap,

FIG. 2 presents a view of a rotating sector mirror,

FIG. 3 shows schematically an arrangement of the sector mirror in connection with a phase-control device, FIG. 4 is a diagram of the voltage delivered by the photoelectric cell, FIG. 5 is a diagram of the control voltage derived from it, FIG. 6 is a diagram of the phase-sensitive control device, FIG. 7 presents schematically the path of measuring rays in the case of the measuring of production part diameters.

Reference numerals 1 and 2 (FIG. 1) designate two rolls the slit-shaped distance of which shall be measured. From a light source 3 a slit 5 is illuminated by means of a condenser lens 4. By means of an objective 6 a parallel beam of rays is produced which is sharply focused as measuring beam of rays by a second objective 7 in the area of the roll gap to be measured. Behind rolls 1, 2 a triple reflector 8 is positioned which reflects the incident radiation back along its path of incidence. Through a semipermeable mirror 9 the reflected beam of rays is directed on a photoelectric cell or photoelectric diode 10. Between objectives 6 and 7 a sector mirror 11 is rotating inclined at a 45-degree angle relative to the optical axis which periodically diverts the parallel beam of rays about 90 degrees whereafter it is focused as comparison beam of rays by means of an objective 12 on the gap adjustable by a micrometer screw 14' of a pair of roll sections 13, 14 serving as standard object. This standard object need not be complete rolls naturally but it is sufficient to have roll sections of corresponding shape and surface condition. Behind the standard objects 13, 14 a further reflex reflecting mirror 15 is being provided. The reversed beam of rays travels through the sector mirror 11 and the semi-permeable mirror 9 onto the photoelectric cell 10. The photoelectric cell 10 is therefore being impinged upon alternatingly by a beam of rays which has passed the measuring distance between rolls 1, 2 or by a beam of rays which has traversed the standard distance between rolls 13, 14. If both distances are equal, that is to say if both beams of rays are attenuated to the same extent when passing between the rolls, the intensity of both beams of rays is also the same. If one of the distances and with it one of the intensities is being increased the photoelectric cell 10 delivers an alternating voltage the phase position of which depends on which one of the intensities is greater. This voltage e.g. can be fed through an amplifier 16 to a phase-sensitive control device 17. Signal lamps can e.g. be connected to the control device 17. Furthermore adjusting means 18 can be controlled by it for the purpose of adjusting rolls 1, 2.

The sector mirror (FIG. 2) consists of a disc, one half of which 11' is reflecting, whereas the other half 11'' is designed to be transparent. Naturally, also a semicircular reflecting disc can be used. The sector mirror 11 is actuated by a synchronous motor driven at line frequency. In order to assure that the sector mirror interrupting synchronously to the line frequency is operating in phase, a phase control device 20 is provided in the known manner.

With reference to FIGS. 4 to 6 a phase-sensitive control shall be described not pertaining to the invention and which can also be replaced by any other, e.g. one operating with a ring modulator. Through the interruption of the radiation paths the photoelectric cell 10 delivers an alternating voltage the frequency of which is depending on the speed of the sector mirror 11. If, e.g. the sector mirror 11 is driven with 3000 r.p.m., an alternating voltage of 100 cycles is produced. Through diversity of the intensities of the measuring and the comparison beams of rays the amplitudes of this alternating voltage become different so that the result is a diagram as presented in FIG. 4. This photoelectric voltage contains a 50-cycle-component dependent on the intensity difference, which is shown in FIG. 5. The photoelectric voltage is fed through a preamplifier 21 to a low pass filter 22, which bars the frequency of 100 cycles and only lets through the 50-cycle component. The 50-cycle component is amplified in a power amplifier 23 and used for the control of a condenser motor 24 connected to the line. The motor actuates the adjustment means 18 in one sense or another until equal intensity of the measuring and the comparison beam of rays has been achieved and by this the 50-cycle component has disappeared.

In FIG. 7 a production part 25 has been intimated being worked, e.g. on a turning lathe not shown. The measuring beam of rays focused by objective 7 touches the production part tangentially in such a manner that it is attenuated about one half when reaching a theoretical diameter (2a). In a corresponding manner the comparison beam of rays not shown is directed to an object of comparison. With the described photoelectric device the theoretical diameter of the production part can be adhered to with great precision and the manufacturing machine can automatically be stopped in the case of same intensity of measuring and comparison beams of rays. It is essential, as also in the case of the first embodiment, that the object of comparison (13, 14) corresponds to the object of measurement with respect to its shape and surface character, so that the same optical conditions (phenomena of diffraction and reflection) are produced in the path of comparison beam of rays as they are prevalent in the path of measuring beam of rays.

I claim:

1. A photoelectric device for high precision measurement of an object comprising a light source, means for focusing a measurement beam of light from said light source at the surface of said measurement object for attenuation of said beam, a comparison object adjustably arranged, means for periodically diverting the beam of light from said light source to form a comparison beam and means for focusing said comparison beam at a surface of said comparison object for attenuation of said beam, the surface of said comparison object at the area of incidence with said comparison beam being of substantially the same shape and surface condition as the surface of said measurement object at the area of incidence with said measurement light beam, a first reflex-reflecting means for returning the attenuated measurement beam substantially along its outgoing path mounted at the side of said measurement object opposite said light source, a second reflex-reflecting means for returning the attenuated comparison beam substantially along its outgoing path mounted at the side of said comparison object opposite to that of said light source, a photoelectric element, means for directing both the returning measurement beam and the returning comparison beam on said photoelectric element, and means for measuring the electrical output of said photoelectric element produced by each attenuated beam as an indication of the relative dimensions of said measurement object and said comparison object.

2. A photoelectric device according to claim 1 wherein said measurement object is a rotating body, said measuring beam is directed tangentially to said measuring body, and said comparison beam is directed tangentially to said comparison object.

3. A method of adjusting the size of a slit-shaped roll gap between a pair of rolls one of which is provided with powered adjusting means for moving it toward and from the other, which comprises passing a beam of light for attenuation thereof through said roll gap tangentially to said rolls, said beam being focused at a point substantially in the gap between said rolls, returning said attenuated beam by auto-collimation along its outgoing path, periodically diverting said light beam to form a comparison beam and directing said comparison beam for attenuation thereof through a comparison gap of a comparison object tangentially to the surfaces of the comparison object forming the gap, said comparison beam being focused at a point substantially in said comparison gap, the surfaces of said comparison object forming the comparison gap being of substantially the same shape and surface characteristics as the surfaces of said rolls, and micrometer-adjusted to the desired gap size, returning said comparison beam by auto-collimation along its outgoing path, applying the returned attenuated beams to a single photoelectric means and applying the resulting outputs of said photoelectric means through amplifiers and phase sensitive means to cause driving of the adjusting means, if said outputs are unequal, to move a roll of said pair in the direction to bring the gap to equality with the comparison gap.

4. A method for measuring the diameter of a large production part which comprises passing a measurement beam of light tangentially past said part, said beam being focused substantially at the point of tangency with said part and so arranged that said part attenuates a portion of said beam, periodically deflecting said beam to form a comparison beam and passing said beam tangentially to a comparison object, said beam being focused substantially at the point of tangency and so arranged that said comparison object part attenuates a portion of said beam, returning by reflection both said attenuated measurement beam and said attenuated comparison beam substantially along their outgoing paths, and measuring the relative intensities of said returning attenuated beams as an indication of the relative measurements of said part and said comparison object, the reflection of at least the measurement beam being of the auto-collimation type to refocus the beam substantially at the said point of tangency.

References Cited in the file of this patent

UNITED STATES PATENTS

| | | |
|---|---|---|
| 1,962,742 | Jongedyk | June 12, 1934 |
| 1,999,023 | Sharp et al. | Apr. 23, 1935 |
| 2,332,289 | Zeitlin | Oct. 19, 1943 |
| 2,670,651 | Burns et al. | Mar. 2, 1954 |
| 2,758,502 | Scott et al. | Aug. 14, 1956 |